(No Model.)

L. R. & E. A. WITHERELL.
PORTABLE SCALE FOR WEIGHING VEHICLES.

No. 344,762. Patented June 29, 1886.

WITNESSES
Villette Anderson.
J. A. Taubenschmidt.

INVENTORS
Loren R. Witherell
Erie A. Witherell
by
Attorney

UNITED STATES PATENT OFFICE.

LOREN R. WITHERELL AND ERIE A. WITHERELL, OF DAVENPORT, IOWA, ASSIGNORS TO THE DAVENPORT PORTABLE SCALE COMPANY, OF SAME PLACE.

PORTABLE SCALE FOR WEIGHING VEHICLES.

SPECIFICATION forming part of Letters Patent No. 344,762, dated June 29, 1886.

Application filed March 10, 1886. Serial No. 194,675. (No model.)

*To all whom it may concern:*

Be it known that we, LOREN R. WITHERELL and ERIE A. WITHERELL, citizens of the United States, residing at Davenport, in the county of Scott and State of Iowa, have invented certain new and useful Improvements in Portable Scales for Weighing Vehicles and other Bodies; and we do hereby declare the following to be a full, clear, and exact description of the invention, such as will enable others skilled in the art to which it appertains to make and use the same.

This invention relates to scales for the weighing of loaded wagons or vehicles of any kind, and may be applied to heavy objects which cannot be conveniently lifted by manual power upon the ordinary scales in common use. It is portable, and can be easily moved and applied to the wagon or object to be weighed, wherever that may happen to be, thus avoiding the labor, loss of time, and inconvenience of conveying the load to stationary scales. In operation the weight resting upon each wheel of a vehicle is separately and successively ascertained. The weights of these several parts are then added together, and their sum will give the weight of the whole load. In like manner one end or side of an object may be weighed at a time. The sum of the weights of each end is the weight of the whole. The apparatus is very exact, and will weigh as closely and accurately as the best platform-scales.

The invention consists in the improved mechanism and combinations hereinafter described and claimed.

Figure 1:
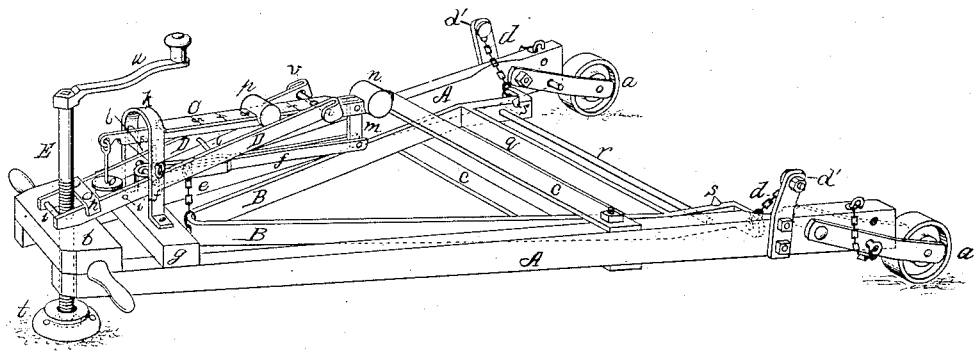
Figure 2:
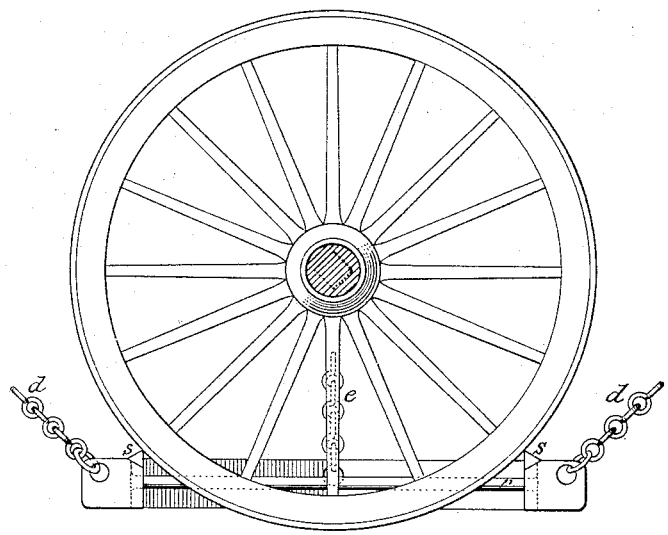
Figure 3:
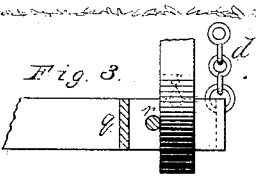

Figure 1 of the drawings is a perspective view. Fig. 2 is a detail showing the application of the triangle or platform to the wheel of the vehicle. Fig. 3 is a sectional detail of the same.

The weighing apparatus is supported upon a substantial bifurcated frame, A, strongly braced. The forward ends of the sides of this frame are spread apart far enough to admit between them the lower part of the wheel of a large wagon or other vehicle, but the sides of the frame do not touch the tire. These ends are provided with adjustable rollers or wheels $a\ a$, which serve not only for locomotion, but to raise the frame when necessary to accommodate it to smaller wheels, or to make the frame stand reasonably level if the ground should be uneven. The frame is joined at its rear or narrow end by a substantial cross-piece, $b$, provided with handles, by means of which the rear end of the frame with the apparatus upon it can be raised up when it is to be wheeled forward to the object to be weighed or moved from place to place. Braces $c\ c$, near the forward part of the frame, firmly affixed to the top and bottom of the side pieces, keep the sides spread apart to the desired width and strengthen the frame.

A triangle, B, is hung by three short chains, and swings freely between the braces $c\ c$. The two chains $d\ d$, attached to the forward projections of this triangle, are affixed to the upper ends of irons $d'\ d'$, fastened to the sides of the frame. The upper ends of these irons are bent outward to prevent the chains from binding upon the wheel of the vehicle to be weighed. These irons and their chains are the fulcra supporting the ends of the triangle and the weight upon it. The third chain, $e$, is the link attaching the point or apex of the triangle to the lower lever, $f$, of the scale-beam C. The standards D D, which bear the fulcra $f'$ of the lower lever, $f$, and scale-beam, have their lower ends firmly fixed into the rear block, $b$, and incline toward the front part of the machine, being supported at the proper angle by the cross-block $g$, affixed upon the sides of the frame. These standards are held in a parallel position by the brace $h$ and brace-rods $i\ i\ i$. The yoke $k$ also acts as a brace, and serves further to inclose the end of the scale-beam and prevent it from flying upward when the load is put on. It also carries the stop $l$ to support the scale-beam from dropping too low when the weights are on and the load removed. The lever $f$ has its fulcrum in the standards at a point between the arms of the yoke $k$ and behind the link-chain $e$, the long arm of the lever being attached to the scale-beam by the link $m$. The scale-beam has its fulcrum $v$ in the top of the standards, and is provided on its short end with a counterpoise, n. The long end carries a weight-holder, o, and the beam is graduated, carrying a sliding pea, p.

The forward end or base of the triangle is formed by the cross-piece q, and its projecting ends are joined and strengthened by the rod or bar r. These projecting ends are provided at the proper distance from the fulcrum-chains d d with the elevated bearing-points s s, which catch and hold the tire of the wheel.

When a vehicle is to be weighed, the apparatus is raised by the handles attached to the rear end and pushed upon the forward rollers up to the wheel, so that the rod r will just touch the fellies or tire. This brings the bearing-points s s about under the middle of the tire on each side. If the wheel be small, the forward ends of the frame can be raised by means of the adjustable rollers. The rear cross-piece, b, is tapped to receive the screw E, or provided with tapped plates secured to the top or bottom of the block. This screw works in a ball-and-socket joint, t, resting upon the ground, and has a crank or handle, u, by which it is turned. The apparatus being set against and under the wheel of the vehicle, the load will be raised from the ground by turning the screw, its weight then resting upon the triangle at the points s s. This of course depresses the point or apex of the triangle and the lever to which it is linked, showing the weight upon the graduated scale-beam. The weight of the part resting upon each wheel being successively ascertained, and the whole added together, the sum will be the weight of the whole load. A platform may be provided and adjusted upon the triangle, so that horses, fat cattle, or other live stock, as well as sacks of grain and the like, may be readily and accurately weighed.

The apparatus is portable and easily moved from place to place wherever its services may be required. When not in use, it can be housed in the barn or store-house and kept free from exposure to injury from the weather.

What we claim as of our invention, and desire to secure by Letters Patent, is—

1. A weighing apparatus comprising the frame A, bearing the triangle B, the fulcrum-chains d d and e, by which said triangle is hung to the frame and scale-beam, the lever f, the scale-beam C, and the standards D D, supporting said lever and beam, substantially as shown and described, and for the purposes set forth.

2. In a weighing apparatus, the portable frame A, provided with adjustable rollers a a and cross-piece b, and handles attached to the rear cross-piece, b, in combination with the swinging triangle, the lever, the graduated scale-beam, and the inclined standards supporting said beam and lever, substantially as specified and shown, and for the purposes stated.

3. In a weighing apparatus, the swinging triangle hung to the frame by fulcrum-chains, and linked to the lever and scale-beam, in combination with the lever, the scale-beam, the chains, the standards, and frame, substantially as described and shown, and for the purposes set forth.

4. In a weighing apparatus, the frame provided with the rear cross-piece, the elevating-screw working therein, and adjustable rollers attached to the forward ends of the frame, in combination with the swinging triangle, the lever, the scale-beam, and the inclined standards, substantially as shown and described, and for the purposes set forth.

LOREN R. WITHERELL.
ERIE A. WITHERELL.

Witnesses:
J. W. STEWART,
E. H. ALBRECHT.